US008744177B2

(12) United States Patent
Lim et al.

(10) Patent No.: US 8,744,177 B2
(45) Date of Patent: Jun. 3, 2014

(54) IMAGE PROCESSING METHOD AND MEDIUM TO EXTRACT A BUILDING REGION FROM AN IMAGE

(75) Inventors: Hwa Sup Lim, Hwaseong-si (KR); Do Kyoon Kim, Seongnam-si (KR); Kee Chang Lee, Yongin-si (KR); Sun Hyuck Chae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 991 days.

(21) Appl. No.: 12/314,018

(22) Filed: Dec. 2, 2008

(65) Prior Publication Data

US 2009/0257650 A1    Oct. 15, 2009

(30) Foreign Application Priority Data

Apr. 14, 2008    (KR) .......................... 10-2008-0034394

(51) Int. Cl.
*G06K 9/00*    (2006.01)
(52) U.S. Cl.
USPC ......................................................... 382/165
(58) Field of Classification Search
None
See application file for complete search history.

(56) References Cited

U.S. PATENT DOCUMENTS

| 6,975,758 B2* | 12/2005 | Nicolas ......................... 382/165 |
| 2002/0063893 A1* | 5/2002 | Fujieda ......................... 358/1.15 |
| 2008/0117296 A1* | 5/2008 | Egnal et al. ................... 348/143 |

OTHER PUBLICATIONS

"Equation of a Straight Line" [Online] 2011 [retrieved on Dec. 21, 2011] Retrieved from Internet: <URL: http://www.mathsisfun.com/equation_of_line.html>.*
Zhang, Wei et al. "Hierarchical building recognition". Image and Vision Computing, vol. 25, Issue 5, May 1, 2007, pp. 704-716. [Retrieved Online: Nov. 28, 2011].*
Rafael C. Gonzalez, et al., "Digital Image Processing", published by Prentice Hall (1993), pp. 432-439 and 484-487.

* cited by examiner

*Primary Examiner* — Atiba O Fitzpatrick
*Assistant Examiner* — Thomas A James
(74) *Attorney, Agent, or Firm* — Staas & Halsey LLP

(57) ABSTRACT

Provided is a method of performing an image segmentation so as to extract a building region from an input color image. The method includes extracting a plurality of straight lines that pass through a vanishing point and determining the building region in the image based on color values around the plurality of straight lines.

28 Claims, 14 Drawing Sheets

IMAGE PROCESSING METHOD AND MEDIUM TO EXTRACT A BUILDING REGION FROM AN IMAGE

CROSS-REFERENCE TO RELATED APPLICATIONS

This application claims the priority benefit of Korean Patent Application No. 10-2008-0034394, filed on Apr. 14, 2008 in the Korean Intellectual Property Office, the disclosure of which is incorporated herein by reference.

BACKGROUND

1. Field

One or more embodiments of the present invention relate to an image processing method, more particularly, to performing an image segmentation so as to extract a building region from an input color image.

2. Description of the Related Art

Currently, research is being conducted regarding three-dimensional (3D) image modeling from a color image. In connection with this research, one of promising technique is an image processing technique that performs segmenting a ground region, a building region, and sky region from the image. Image Segmentation is a technique that extracts an interesting region from a given image and importance of the technique is increasing because the 3D image modeling and also Motion Pictures Experts Group 4 (MPEG-4) encoding method are based an object. Specifically, the image processing technique that segments the building region from the other images may significantly affect efficiency of the 3D image modeling of urban scenes.

The method of extracting the building region from the input color image is based on the image segmentation that separates the building region from other regions. The image segmentation algorithm includes a Region-based approach and an Edge-based approach. The Region-based approach is a method which performs grouping of adjacent pixels in a space based on the fact that values, colors, or textures of the adjacent pixels in the same region are similar with each other. The Region-based approach includes a Region growing, a Region splitting and merging, and a Clustering method.

However, according to a conventional art, since a method for identifying a region which belongs to the building region among the grouped regions is not suggested, directly segmenting the building region using a single image processing method is impossible. Thus, an algorithm besides the image segmentation method is separately required.

SUMMARY

An aspect of an embodiment of the present invention provides a method of extracting a pixel corresponding to a building region from each pixel of an input color image, and a computer-readable recording medium having stored thereon instructions for implementing the method.

Another aspect of an embodiment of the present invention also provides a method of identifying a pixel corresponding to a building region from an input image using a vanishing point of the input image, and a computer-readable recording medium having stored thereon instructions for implementing the method.

Another aspect of an embodiment of the present invention also provides a computer-readable recording medium having stored thereon instructions for implementing a method of extracting a pixel corresponding to a building region from each pixel of an input image based on color values of perimeter region of straight lines corresponding to the same vanishing point among a plurality of straight lines extracted from the input image, when vanishing point information is not provided from the input image.

According to an aspect of an embodiment of the present invention, there is provided a method of processing an image including extracting a plurality of straight lines that pass through a vanishing point from an image; and determining a building region in the image based on color values around the plurality of straight lines and a computer-readable recording medium having stored thereon instructions for implementing the method.

In an aspect of an embodiment of the present invention, the extracting of the plurality of straight lines that pass through the vanishing point from the image includes extracting a plurality of straight lines at a plurality of angles from the image and extracting the plurality of straight lines that pass through the vanishing point among the plurality of straight lines at a plurality of angles.

In an aspect of an embodiment of the present invention, the extracting of the plurality of straight lines at a plurality of angles from the image includes extracting a plurality of horizontal edges and detecting the plurality of straight lines at a plurality of angles using the plurality of horizontal edges.

In an aspect of an embodiment of the present invention, the extracting of the plurality of straight lines that pass through the vanishing point among the plurality of straight lines at a plurality of angles includes forming an equation of each line in the plurality of straight lines at a plurality of angles and extracting the plurality of straight lines that pass through the vanishing point among the plurality of straight lines at a plurality of angles based on a difference between a y coordinate value of the vanishing point and a y coordinate value of the equation, the equation corresponding to a x coordinate value of the vanishing point.

In an aspect of an embodiment of the present invention, the determining of the building region in the image based on the color values around the plurality of straight lines includes determining a perimeter region of the plurality of straight lines, performing a histogram analysis for the perimeter region, and determining the building region based on the histogram.

In an aspect of an embodiment of the present invention, the determining of the building region based on the histogram includes calculating a probability corresponding to each of the color values from the histogram, and determining whether each pixel belongs to the building region in the image based on a color value of each pixel of the image and the probability corresponding to each of the color values.

According to another aspect of an embodiment of the present invention, there is provided a computer-readable recording medium having stored thereon instructions for implementing a method of processing an image, wherein the instructions include a set of instruction of extracting a plurality of straight lines from an image, a set of instruction of determining a straight line that corresponds to the same vanishing point among the plurality of straight lines, and a set of instruction of determining a building region in the image based on color values of a perimeter region of the straight line that corresponds to the same vanishing point.

In an aspect of an embodiment of the present invention, the determining of the building region in the image based on the color values of the perimeter region of the straight line that corresponds to the same vanishing point includes determining a predetermined region around the straight line that corresponds to the same vanishing point as the perimeter region, performing a histogram analysis for the color values of the perimeter region, and an instruction set of determining the building region based on the histogram.

Additional aspects, features, and/or advantages of the invention will be set forth in part in the detailed description which follows and, in part, will be apparent from the detailed description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
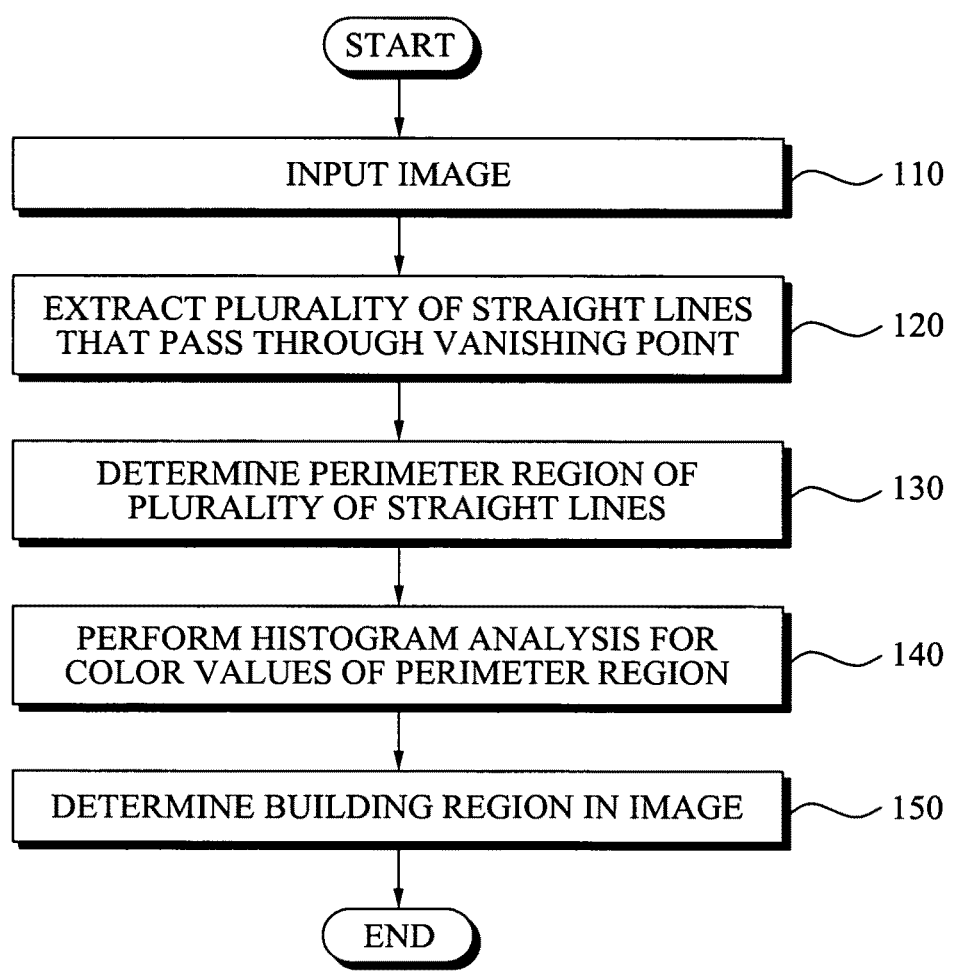
FIG. 1 is a flowchart illustrating an image processing method according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a flowchart illustrating an image processing method according to an exemplary embodiment of the present invention.

In operation 110, an image is inputted. The input image is a color image. According to an exemplary embodiment of the present invention, the color image is an image file comprised of RGB data. A file format of the color image may be in a variety of types, such as a bitmap (.bmp file), Joint Photographic Experts Group (.jpeg, .jpg files), and raw formats. When the file format is in a data-compressed format, decompression may be performed before a start of the image processing.

According to another exemplary embodiment, accuracy and/or efficiency of image processing increases through a variety of pre-processes to the input image. For example, a value (or a brightness) or a contrast of the input image is adjusted, and the adjusted resulting image can be an input image for the image processing. Also, the pre-processes may include a variety of filter mask processes.

In operation 120, a plurality of straight lines that pass through a vanishing point are extracted. A plurality of horizontal edges are extracted from the image. The edges, which correspond to an outline of an object, correspond to a corner between a face and another face or an unconnected face, and the like. The edges may include an edge that is close to a straight line, and an edge that is different from a straight line. A plurality of straight lines at a plurality of angles are detected using the plurality of horizontal edges. Among the edges, an edge that has a certain direction, and the length of which is longer than a predetermined length is detected as straight lines. The straight lines are the plurality of straight lines at the plurality of angles. The plurality of straight lines include a line which passes through the vanishing point and a line which does not pass through the vanishing point. The line which passes through the vanishing point has a high probability of being in a building region. Among the plurality of lines at the plurality of angles, a plurality of straight lines which pass through the vanishing point are extracted.

To perform the above, an equation of each line in the plurality of straight lines at the plurality of angles is formed and a predetermined threshold is compared with a difference $(abs(y_1-y_{vp}))$ between a y coordinate value $(y_1)$ of the equation and a y coordinate value of the vanishing point $(y_{vp})$, the equation corresponding to the x coordinate value of the vanishing point. When the difference exceeds the threshold, the straight lines are determined as lines that do not pass through the vanishing point. Only when the difference is equal to or less than the threshold, the straight lines are determined as lines that pass through the vanishing point.

In operation 130, a perimeter region of the plurality of straight lines is determined. A group of pixels which are closer than a predetermined distance from a pixel corresponding to the straight lines which pass through the vanishing point is determined as the perimeter region. According to another aspect of an exemplary embodiment, a feedback process which varies the predetermined distance into a longer distance or a shorter distance depending on quality of the image processing result may further included.

In operation 140, a histogram analysis for color values of the perimeter region is performed. A number of pixels of the perimeter corresponding to the color values in the histogram is calculated. Upon making a graph of a calculation result, a color value band where a great number of pixels exist is recognized.

In operation 150, the building region is determined in the image. A probability corresponding to each of the color values are calculated from the histogram. The perimeter region of the plurality of straight lines which pass through the vanishing point has a high probability of being in the building region. Thus, in the histogram analysis, the number of pixels of the perimeter region corresponding to the color values may corresponds to a probability that the color value band belongs to the building region. Thus, the graph may show a probability that the color value band belongs to the building region. According to an exemplary embodiment, an image processing method is provided, wherein a process of normalizing the graph is further included. Also, whether each of the pixels belongs to the building region in the image is determined based on the probability. For all of the pixels of the image, a probability that a color value of each pixel belongs to the building region is calculated. Only a pixel with probability greater than a predetermined probability is determined to be in the building region.

Figure 2:
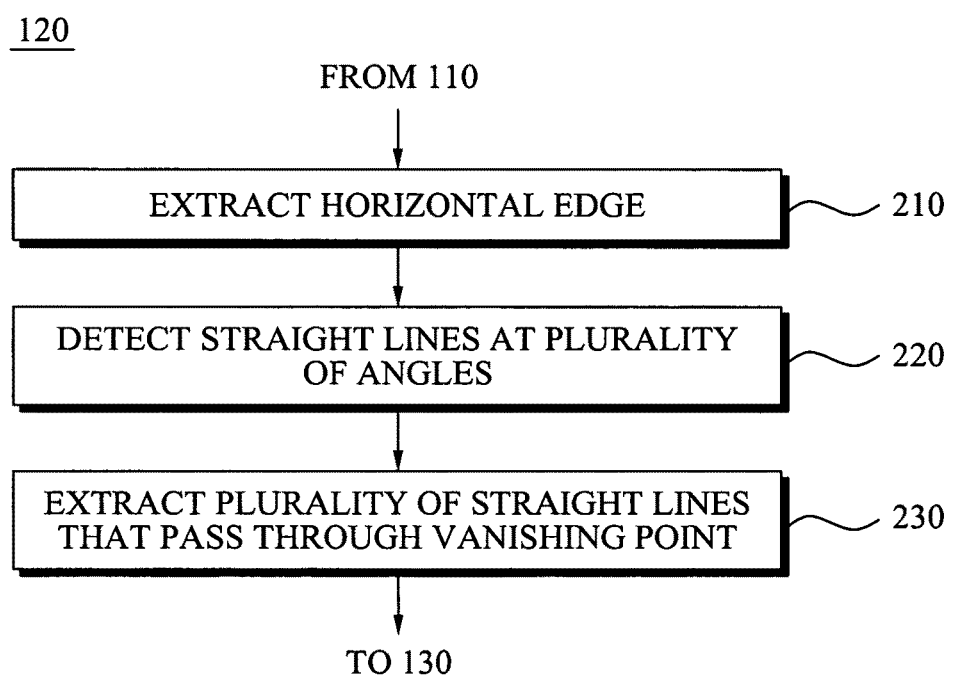
FIG. 2 is a flowchart illustrating a process of extracting of a plurality of straight lines that pass through a vanishing point.

FIG. 2 is a flowchart illustrating a process of extracting a plurality of straight lines that pass through a vanishing point.

In operation 210, a plurality of horizontal edges are extracted from an image. The edges include an edge that has a certain direction and similar to a straight line. Also, the edges include a point edge that does not have a certain direction or an edge that is similar to a curve. The edges, which correspond to an outline of an object, correspond to a corner between a face and another face or an unconnected face, and the like.

According to an exemplary embodiment, a Y axis Sobel operator is applied to the image to generate a Sobel Y gradient image, thereby extracting the plurality of horizontal edges from the image. A mask of an X axis and Y axis of the Sobel operator is expressed as shown in Equation 1.

$$G_r = \begin{bmatrix} +1 & 0 & -1 \\ +2 & 0 & -2 \\ +1 & 0 & -1 \end{bmatrix} * A \quad \text{[Equation 1]}$$

and $$G_y = \begin{bmatrix} +1 & +2 & +1 \\ 0 & 0 & 0 \\ -1 & -2 & -1 \end{bmatrix} * A$$

In the Equation 1, Gx indicates a Sobel X gradient map and Gy indicates a Sobel Y gradient map. The A indicates data of the image. The matrix [1, 0, −1; 2, 0, −2; 1, 0, −1] corresponds to a mask of X axis and the matrix [1, 2, 1; 0, 0, 0; −1, −2, −1] corresponds to a mask of the Y axis. Because a vanishing point given as an input according to an exemplary embodiment relates to a horizontal edge of the image, the mask of the Y axis is applied to the image so as to generate the Sobel Y gradient image.

In operation 220, a plurality of straight lines at a plurality of angles are extracted using the plurality of the horizontal edges. Among the edges, an edge that has a certain direction, and the length of which is longer than a predetermined length is detected as a straight line. The straight lines are a plurality of straight lines at the plurality of angles. The plurality of straight lines include a line which passes through the vanishing point and a line which does not pass through the vanishing point.

According to an exemplary embodiment, the plurality of straight lines at the plurality of angles are detected using the plurality of horizontal edges through either a Hough transform method or a Chain Code method.

A transformation using the Hough transform method may be comprehended through Equation 2A and Equation 2B.

$$y = \left(-\frac{\cos\theta}{\sin\theta}\right)x + \left(\frac{r}{\sin\theta}\right). \quad \text{[Equation 2A]}$$

$$r(\theta) = x_0 \cdot \cos\theta + y_0 \cdot \sin\theta \quad \text{[Equation 2B]}$$

Equation 2A or the Equation 2B represents transformation between an x-y coordinate system and an r-coordinate system. When each pixel of the plurality of horizontal edges in the x-y coordinate system is transformed to the r-coordinate system, each pixel of the plurality of horizontal edges corresponds to a curve in the r-coordinate system. When each pixel of the plurality of horizontal edges forms a straight line, an intersection point of the curve corresponding to the respective each pixel in the straight line in the r-coordinate system is detected. When many more curves intersect at the intersection point, a probability that a corresponding edge in the x-y coordinate system is a straight line is high. Therefore, edges having a high probability of being straight lines may be detected as a plurality of straight lines at a plurality of angles.

Also, the Chain Code method checks a direction according to each pixel of the plurality of horizontal edges, separates the edges upon detecting a variation that is more than a predetermined variation from the direction, and detects the plurality of straight lines. According to an exemplary embodiment, in the case of performing the checking of a direction, when a direction of neighboring pixels is sequentially checked and the neighboring pixels are not determined to be a straight line because a number of pixels that have the same direction is small, the pixels are filtered out. Then, a direction of a next pixel is checked. When the neighboring pixels are determined as a straight line because the number of pixels that have the same direction is large, the pixels are detected as the plurality of straight lines at the plurality of angles. Thus, the neighboring pixels are determined as corresponding to the same straight line unless a great variation is detected from the direction.

According to an exemplary embodiment, the detected plurality of straight lines at the plurality of angles include a line that passes through the vanishing point and a line that does not pass through the vanishing point. The line that passes through the vanishing point has a high probability of being in a building region.

In operation 230, a plurality of straight lines that pass through the vanishing point are extracted from among the plurality of straight lines at the plurality of angles. Initially, an equation of each straight line in the plurality of straight lines at the plurality of angles is formed. Also, a threshold is determined. According to an exemplary embodiment, the threshold is simply given as an input, but the present invention is not limited therein. The threshold is variable according to accuracy of an image processing or a feedback for quality of the image processing. Also, the difference (asb($y_1 - y_{vp}$)) between a y coordinate value ($y_1$) of the equation and a y coordinate value of the vanishing point ($y_{vp}$) is calculated, the equation corresponding to the x coordinate value of the vanishing point. The difference, which is an absolute value, is a positive number. The difference is compared with the threshold. When the difference exceeds the threshold, the straight lines are determined as straight lines that do not pass through the vanishing point. In this case, the straight lines are deleted. Conversely, when the difference is equal to or less than the threshold, the straight lines are determined as straight lines that pass through the vanishing point. Thus, the straight lines that pass through the vanishing point are extracted.

According to an exemplary embodiment, the image that is inputted is provided as an input together with at least one vanishing point of the image. According to another exemplary embodiment, a separate image processing method of extracting at least one of vanishing point of the image may be provided separately or in parallel.

Figure 3:
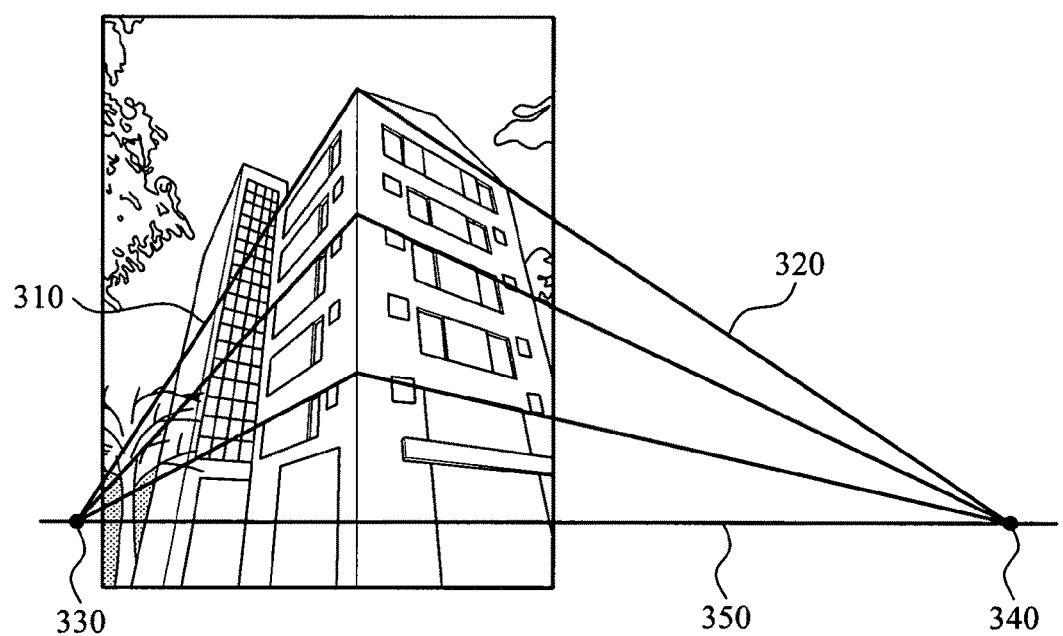
FIG. 3 illustrates a vanishing point of an input image according to an exemplary embodiment of the present invention.

FIG. 3 illustrates a vanishing point of an input image of the present invention.

In case of the image which has 3D information including a real picture of a scenery, a corner of the image or an intersection point where straight lines intersect a horizon is the vanishing point. A straight line 310 passes through a first vanishing point 330. A straight line 320 passes through a second vanishing point 340. The first vanishing point 330 and the second vanishing point 350 are vanishing lines, which corresponds to the horizon. Since a building region in the image illustrated in FIG. 3 is relatively close to a point of eye-view, the first vanishing point 330 and the second vanishing point 340 are out of the input image. A location or a number of vanishing points is variable depending on an input image.

Figure 4A:
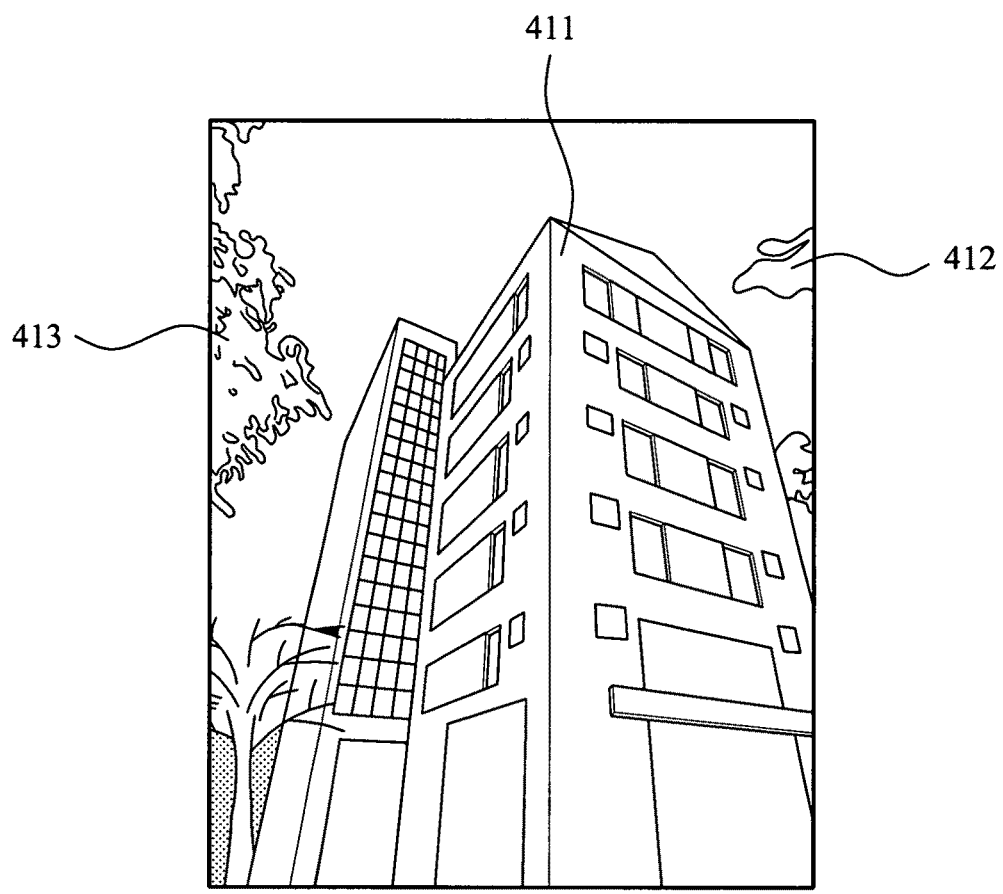
FIG. 4A illustrates an input image according to an exemplary embodiment of the present invention.

FIG. 4A illustrates an input image according to an exemplary embodiment of the present invention. According to an exemplary embodiment, a segmentation of the building region is performed without performing additional image processing for the input image.

The input image includes a building region 411, a sky region 412, a tree region 413, and the like. The image processing method according to an exemplary embodiment of the present invention determines a pixel that is included in the building region 411. Thus, all other regions (e.g. the sky region 412, the tree region 413, and the like) besides the building region 411 are not extracted.

According to another exemplary embodiment, the building region further includes a vertical structure such as the tree region 413 and the like, as occasion demands. Although the building region 411, hereinafter, is described as a region occupied by the vertical structure that is a structure in the image, the building region is not limited therein. Therefore, the building region 411 may include a broad sense of vertical structure (e.g. a tree, a streetlight, and the like) depending on a purpose of the image processing, an application field, and accuracy desired.

Figure 4B:
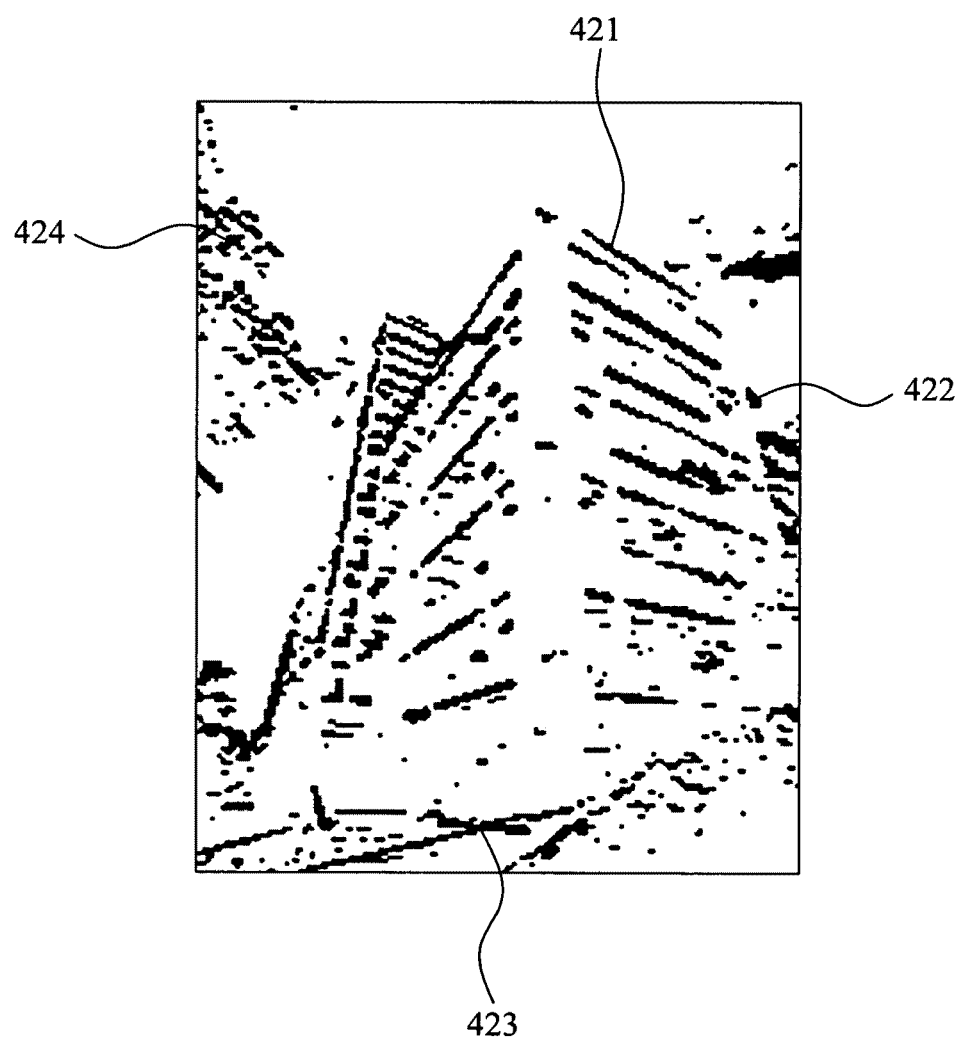
FIG. 4B illustrates an image of a plurality of horizontal edges extracted from the image of FIG. 4A.

FIG. 4B illustrates an image of a plurality of horizontal edges extracted from the image of FIG. 4A. The edges include edges (421 and 423) that have a certain direction and close to a straight line. The edge 421 corresponds to a straight line that passes through the vanishing point. The edge 423 corresponds to a straight line that does not pass through the vanishing point. The edge corresponding to a straight line, which corresponds to an outline of an object, may correspond to a corner between a face and another face or an unconnected face. Also, the edges include edges (422 and 424) that does not have a certain direction and is far from the straight line. The edge 422 corresponds to a cloud image in a background of the input image. The edge 424 corresponds to an outline of a leaf in the background of the input image.

Figure 4C:
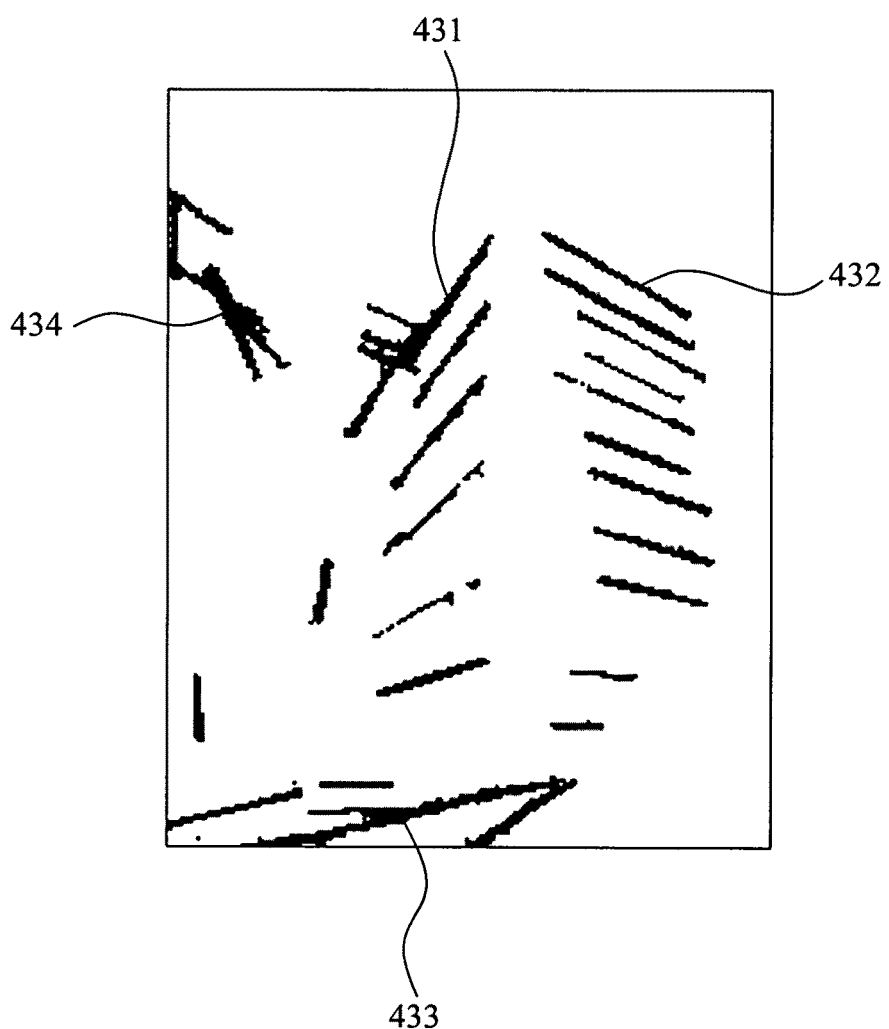
FIG. 4C illustrates an image of a result of detecting a plurality of straight lines at a plurality of angles using the plurality of horizontal edges of FIG. 4B.

FIG. 4C illustrates an image of a result of detecting a plurality of straight lines at a plurality of angles using the plurality of horizontal edges of FIG. 4B. Straight lines 431, 432, 433, and 434 correspond to an edge that has a certain direction and close to a straight line. The straight line 431 is a straight line that passes through a first vanishing point 330 of FIG. 3. The straight line 432 is a straight line that passes through a second vanishing point 340 of FIG. 3. In addition, the straight lines 433 and 434 are straight lines that do not pass through the first vanishing point 330 and/or the second vanishing point 340.

Figure 5:
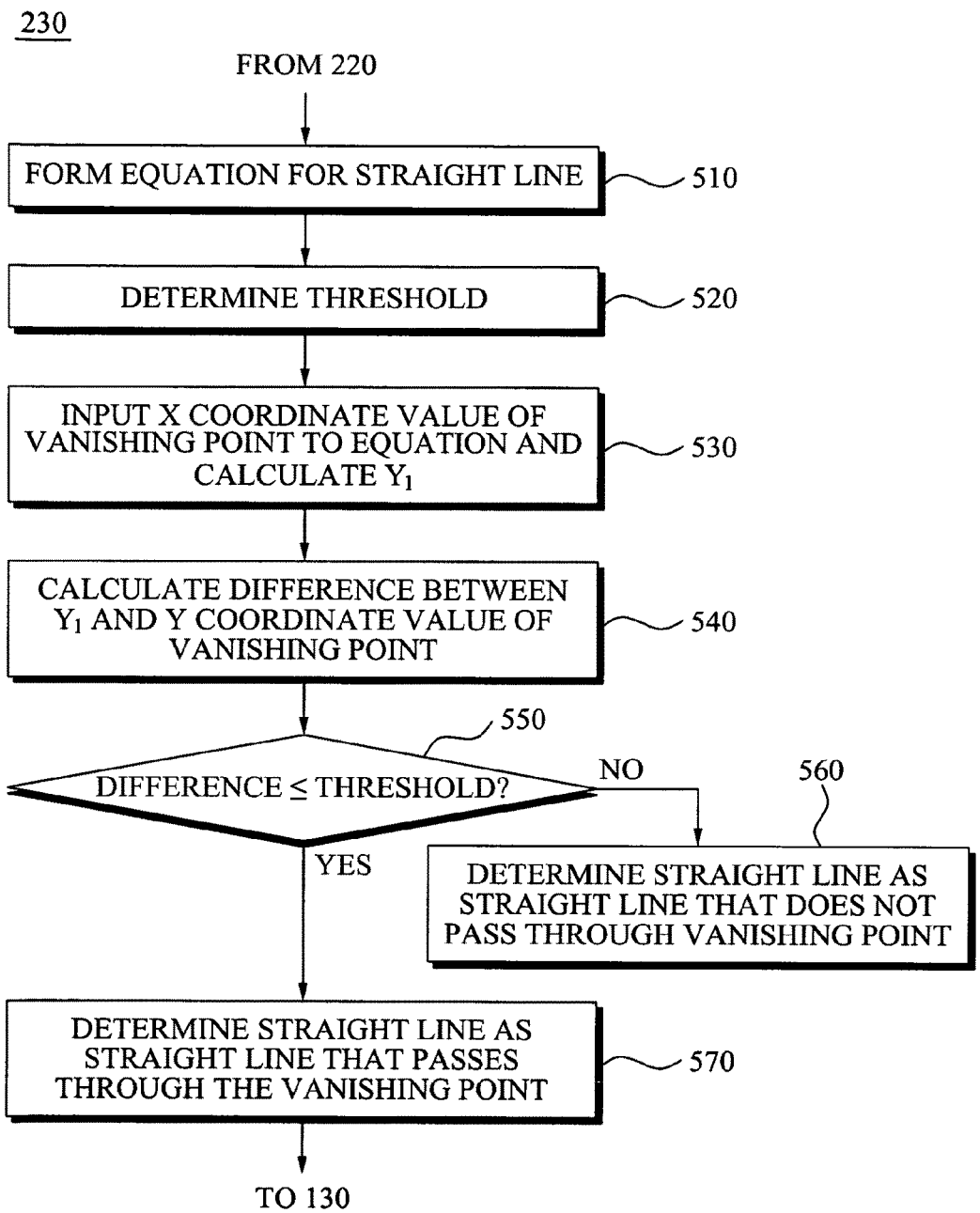
FIG. 5 is a flowchart illustrating a method of extracting a plurality of straight lines that pass through a vanishing point among a plurality of straight lines at a plurality of angles extracted from an image according to an exemplary embodiment of the present invention.

FIG. 5 is a flowchart illustrating a method of extracting a plurality of straight lines that pass through a vanishing point among a plurality of straight lines at a plurality of angles extracted from an image according to an exemplary embodiment of the present invention.

In operation 510, each equation for the plurality of straight lines at the plurality of angles is formed. According to an exemplary embodiment, the equation is expressed as shown in Equation 3A.

$$y = \frac{(y_2 - y_1)}{(x_2 - x_1)}(x - x_1) + y_1 \qquad \text{[Equation 3A]}$$

In the Equation 3A, x and y are variables and $x_1$, $y_1$, $x_2$, and $y_2$ are constants. Also, $(x_1, y_1)$ and $(x_2, y_2)$ are coordinates of two certain pixels included in a straight line.

In operation 520, a threshold is determined. According to an exemplary embodiment, the threshold is a fixed value. However, the present invention is not limited therein. The threshold may be changed based on accuracy of image processing or a feedback for quality of the image processing.

In operation 530, $y_1$ is calculated by inputting $x_{vp}$ that is x value of the vanishing point to the equation.

In operation 540, a difference $(abs(y_1 - y_{vp}))$ between a y coordinate value $(y_1)$ of the equation and a y coordinate value of the vanishing point $(y_{vp})$ is calculated, the equation corresponding to the x coordinate value of the vanishing point. The difference, which is an absolute value, is a positive number.

In operation 550, the difference is compared with the threshold. Operation 550 is performed through the use of Equation 3B.

$$abs(y_1 - y_{vp}) \leq threshold \qquad \text{[Equation 3B]}$$

In Equation 3B, $y_{vp}$ is a y coordinate of the vanishing point, $y_1$ is a y value corresponding to the equation that corresponds to a x coordinate of the vanishing point, and threshold is the threshold.

When the difference exceeds the threshold, a straight line is determined as a straight line that does not pass through the vanishing point in operation 560. In this case, the straight line is filtered out. Conversely, when the difference is equal to or less than the threshold, the straight line is determined as a straight line that passes through the vanishing point in operation S570. Thus, the straight lines that pass though the vanishing point are extracted.

According to an exemplary embodiment, operations 510 through 570 are sequentially repeated with respect to the plurality of straight lines at the plurality of angles. According to another exemplary embodiment, operations 510 through 570 are repeated in parallel with respect to the plurality of straight lines at the plurality of angles.

Figure 6:
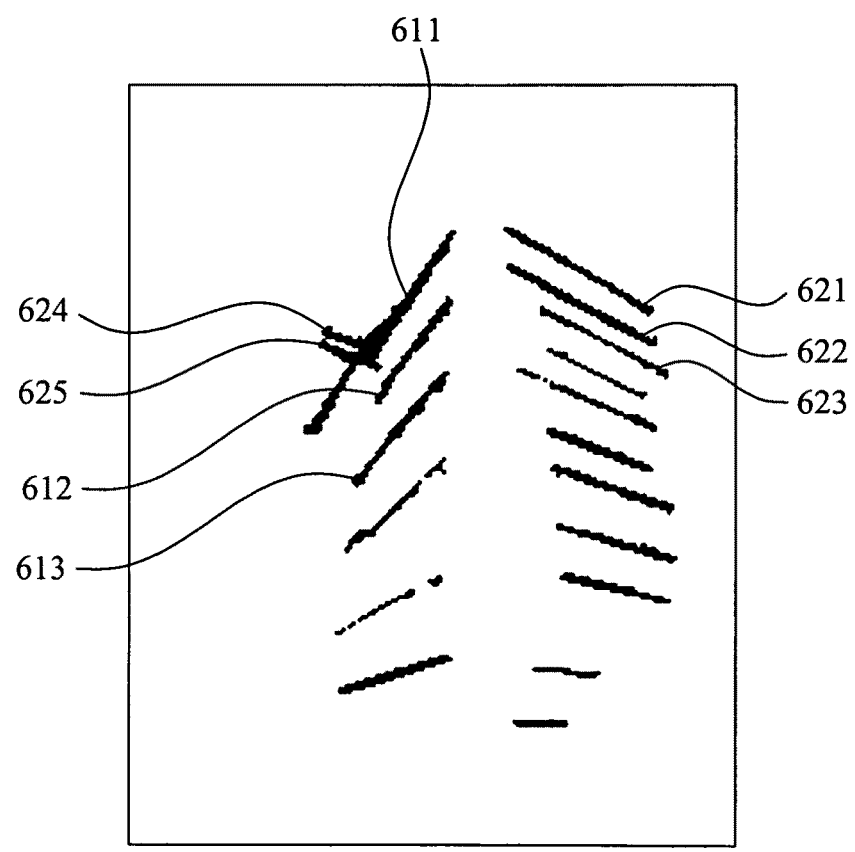
FIG. 6 illustrates a sample image that is a result of extracting a plurality of straight lines which pass through a vanishing point from the input image of FIG. 3.

FIG. 6 illustrates a sample image that is a result of extracting a plurality of straight lines which pass through a vanishing point from the input image of FIG. 3. The straight lines 611, 612, and 613 pass through a vanishing point 330. The straight lines 621, 622, 623, 624, and 625 pass through a vanishing point 340. Pixels corresponding to the plurality of straight lines that pass through the vanishing point have a high probability of being in a building region.

Figure 7:
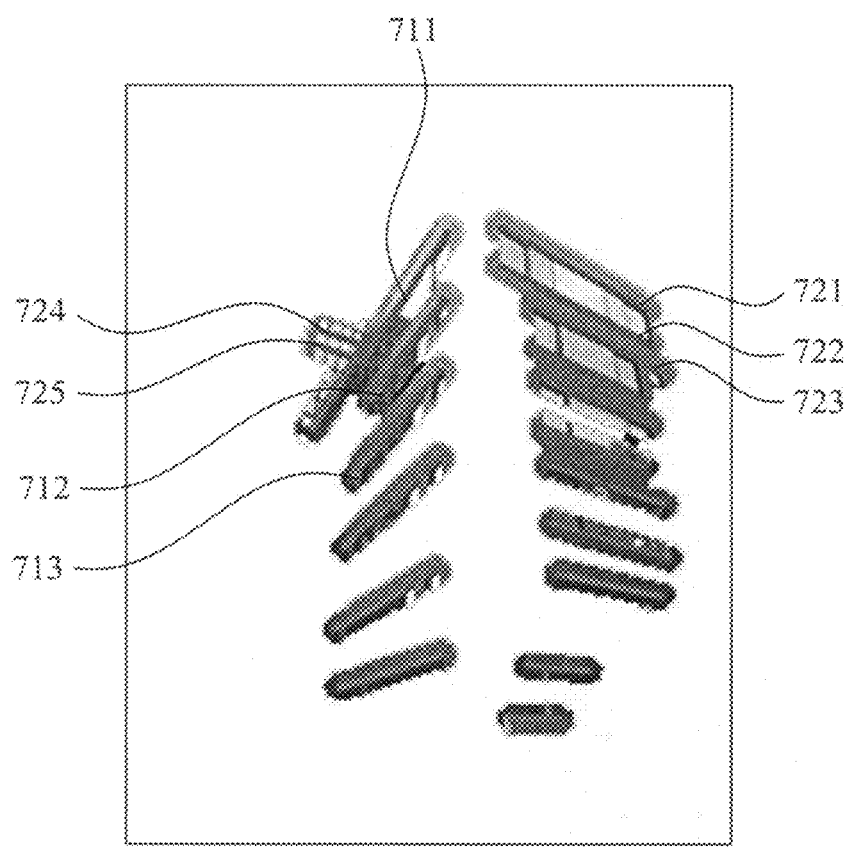
FIG. 7 illustrates a sample image that is a result of extracting a perimeter region of a plurality of straight lines that pass through a vanishing point from the input image of FIG. 4A.

FIG. 7 illustrates a sample image that is a result of extracting a perimeter region of a plurality of straight lines that pass through a vanishing point from the input image of FIG. 4A. Perimeter regions 711, 712, and 713 respectively correspond to the straight lines 611, 612, and 613 of FIG. 6, and perimeter regions 721, 722, 723, 724, and 725 respectively correspond to straight lines 621, 622, 623, 624, and 625 of FIG. 6. The perimeter regions 711, 712, 713, 721, 722, 723, 724, and 725 are groups of pixels that are closer than a predetermined distance from pixels corresponding to the straight lines 611, 612, 613, 621, 622, 623, 624, and 625. According to another exemplary embodiment, a feedback process which varies the predetermined distance into a longer distance or a smaller distance depending on quality of the image processing result may be further included.

Figure 8:
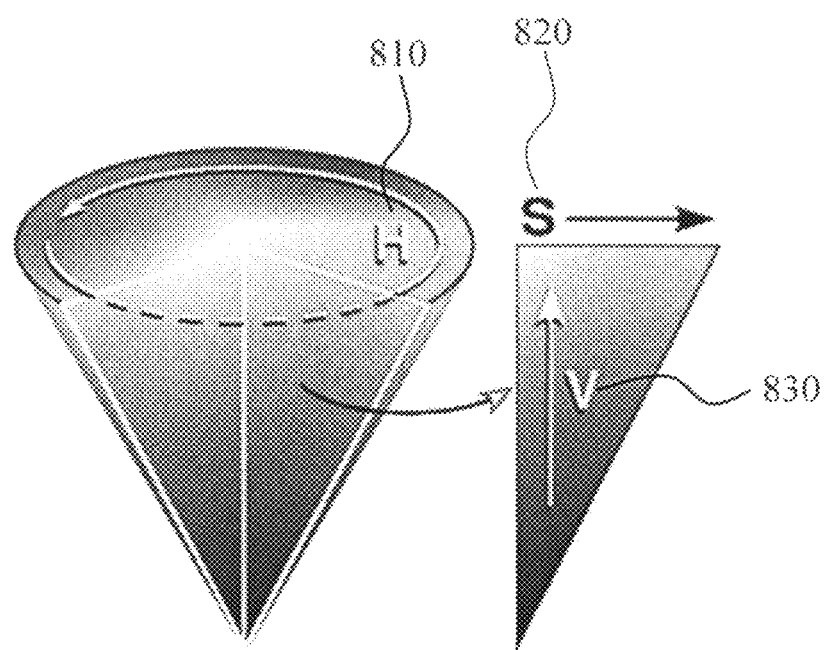
FIG. 8 illustrates a Hue, Saturation, Value (HSV) color model that is used on a color histogram analysis according to an exemplary embodiment of the present invention.

FIG. 8 illustrates a Hue, Saturation, Value (HSV) color model that is used on a color histogram analysis according to an exemplary embodiment of the present invention. H 810 of HSV color model is a Hue (H). The H has a value of 0 through 360 degree. The 0 degree or 360 degree of the H corresponds to a red sphere. Meanwhile, 120 degree of the H corresponds to a greed sphere and 240 degree of the H corresponds to a blue sphere. Also, S 820 is Saturation (S) and V 830 is Value (V). According to exemplary embodiment, when a color value of an input image is a value of an RGB color model, the value is transformed into a value of the HSV color model to perform histogram analysis for the color value. The transformation is comprehended through Equation 4.

$$h = \begin{cases} \text{undefined} & \text{if max} = \text{min} \\ 60° \times \frac{g-b}{\text{max}-\text{min}} + 0°, & \text{if max} = r \text{ and } g \geq b \\ 60° \times \frac{g-b}{\text{max}-\text{min}} + 360°, & \text{if max} = r \text{ and } g < b \\ 60° \times \frac{b-r}{\text{max}-\text{min}} + 120°, & \text{if max} = g \\ 60° \times \frac{r-g}{\text{max}-\text{min}} + 240°, & \text{if max} = b \end{cases}$$ [Equation 4]

$$s = \begin{cases} 0, & \text{if max} = 0 \\ \frac{\text{max}-\text{min}}{\text{max}} = 1 - \frac{\text{min}}{\text{max}}, & \text{otherwise} \end{cases}$$

$$v = \text{max}$$

In the Equation 4, h corresponds to the H 810, s corresponds to S 820, and v corresponds to the V 830. Also, the r is a Red value, g is a Greed value, and b is a Blue value of the RGB color model. Also, max represents a maximum value among r, g, and b, and min represents a minimum value among r, g, and b. According to an exemplary embodiment, the H value of the input image is analyzed by a histogram analysis. V or Contrast (C) has a relatively wide range of variation depending on an angle or an intensity of radiation of a building region in the image, however, H has a relatively narrow range of variation.

According to another exemplary embodiment, when performing a histogram analysis for perimeter regions, an image processing method is provided, wherein H of the perimeter regions excluding a pixel with a V equal to or greater than a predetermined V is analyzed by the histogram analysis. In case of the pixel with a V equal to or greater than the predetermined V, an error of H may exceed an acceptable error range.

Figure 9:
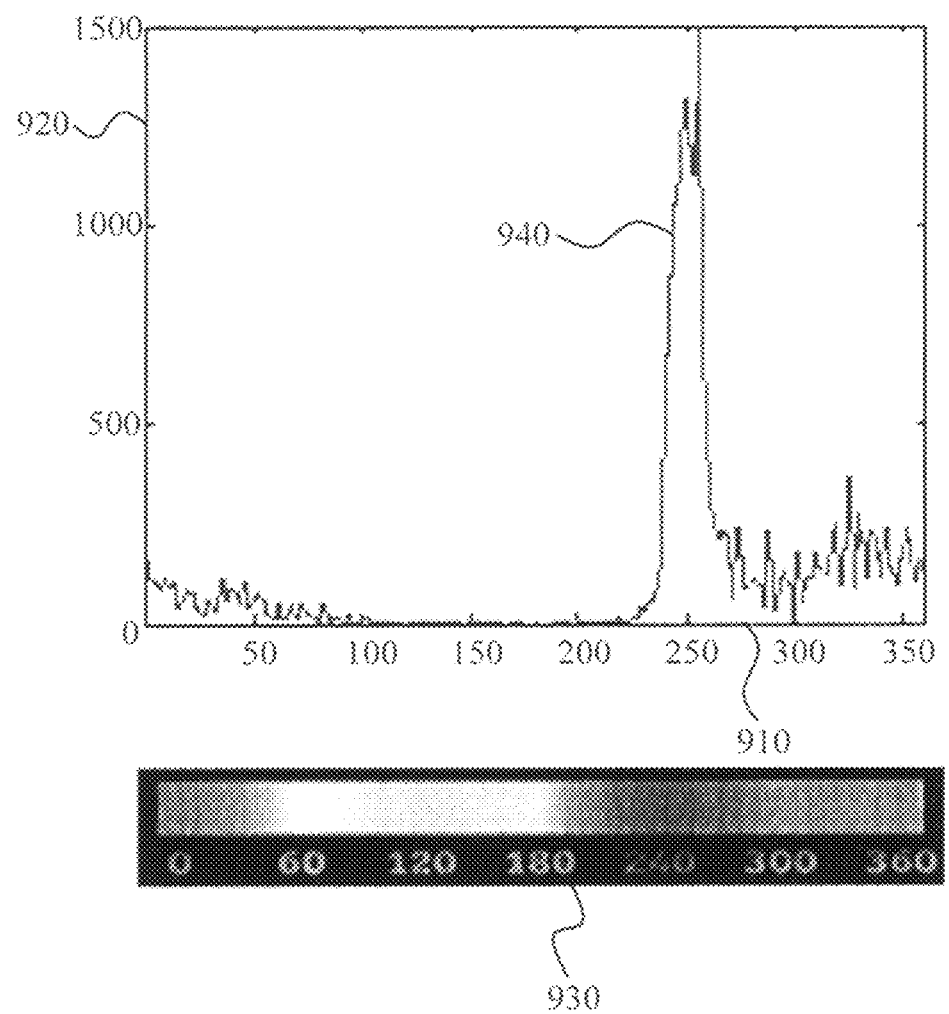
FIG. 9 illustrates a result of performing a histogram analysis for color values of the perimeter region of FIG. 7.

FIG. 9 illustrates a result of performing a histogram analysis for color values of the perimeter region of FIG. 7. A coordinate axis 910 corresponds to an H value and a coordinate axis 920 corresponds to a number of pixels of the perimeter region. A spectrum 930 represents the H value and a corresponding color. A graph 940 is a result of performing a histogram analysis for color values of pixels of the perimeter region based on a hue band. In the graph 940, 240 degree through 270 degree of a hue band has a maximum number of pixels. Also, in a wide range, 0 degree through 60 degree of a hue band and 240 degree through 360 degree of a hue band (violet through red) have a great number of pixels.

Figure 10:
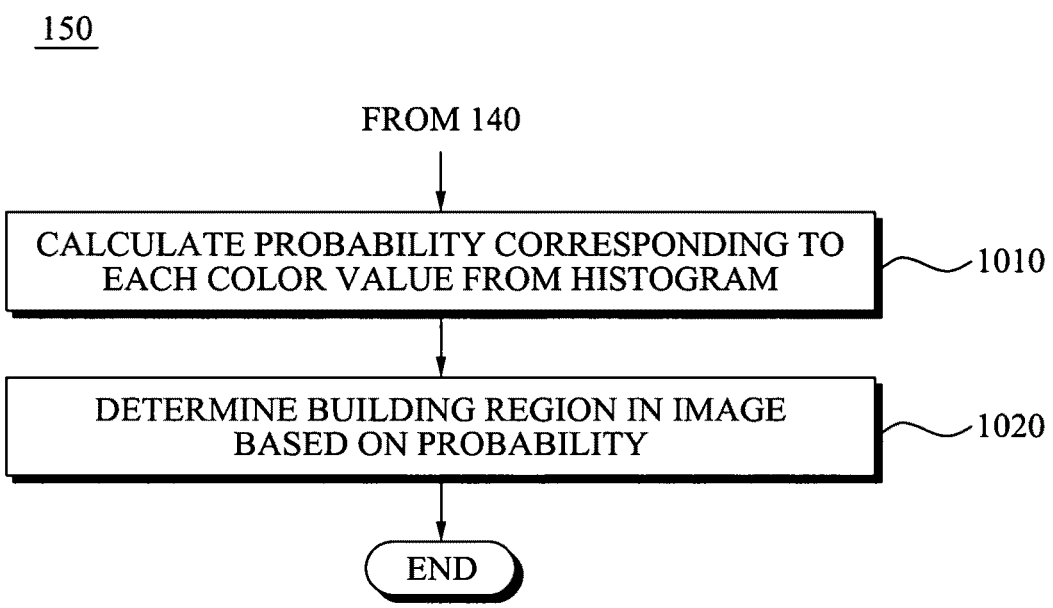
FIG. 10 is a flowchart illustrating a process of determining a building region based on a histogram according to an exemplary embodiment of the present invention.

FIG. 10 is a flowchart illustrating a process of determining a building region based on a histogram according to an exemplary embodiment of the present invention.

In operation 1010, a probability corresponding to each color value is calculated from the histogram. A perimeter region of a plurality of straight lines has a high probability of being in a building region. Thus, referring to the analysis of FIG. 9, the coordinate axis 920 may correspond to the number of pixels of the perimeter region of the plurality of straight lines, and may also correspond to a probability that a color band corresponds to the building region. Thus, the graph 940 may show a probability that a color band belongs to the building region. According to an exemplary embodiment, an image processing method is provided, wherein a process of normalizing the graph 940 is further included. In operation 1020, whether each pixel belongs to the building region in an image is determined based on a color value of each pixel of the image and a probability corresponding to each of the color values. A probability that a color value of each pixel belongs to the building region is calculated with respect to all of the pixels of the image input according to an exemplary embodiment. Only a pixel with probability greater than a predetermined threshold of probability is determined to be in the building region. According to another exemplary embodiment, the predetermined threshold of probability is variable according to purpose, accuracy or quality of the image processing.

Figure 11:
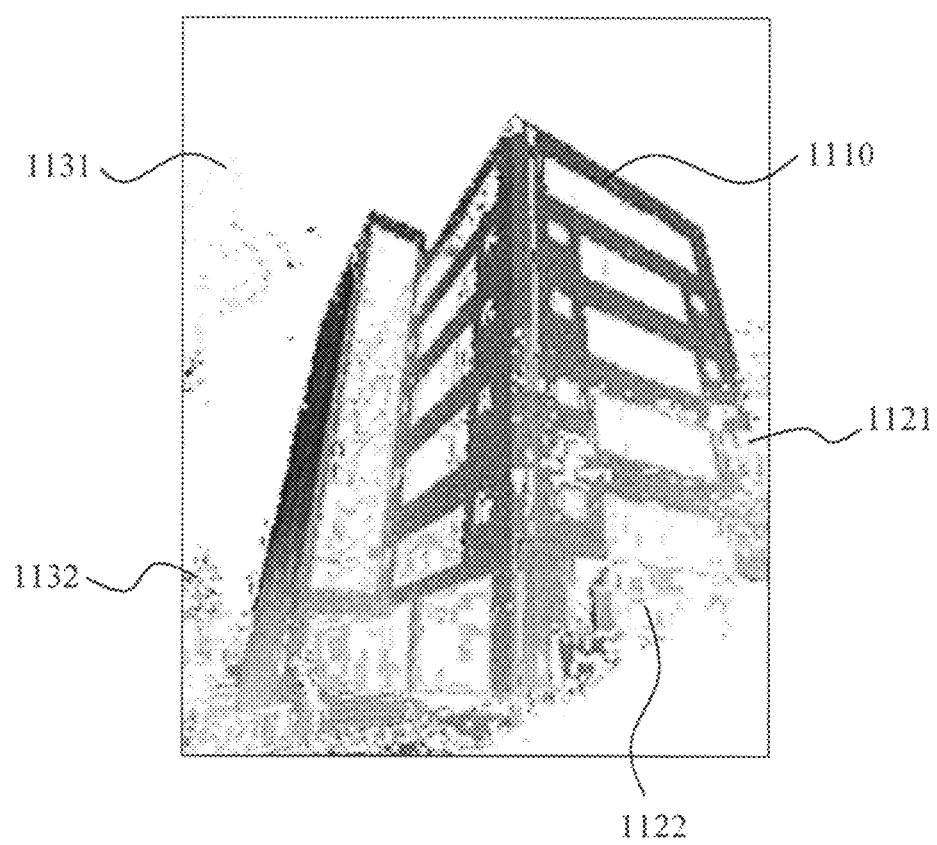
FIG. 11 illustrates a sample image that is a result of applying an image processing method according to an exemplary embodiment of the present invention.

FIG. 11 illustrates a sample image that is a result of applying an image process method according to an exemplary embodiment of the present invention. As a result of the image process, a building region in an input image is extracted as a building region 1110. As a result of the image process, holes 1121 and 1122 appear in the building region 411 in the image. Also, noise 1131 and 1132 appear. According to an exemplary embodiment, an image processing method is provided, wherein a process of eliminating the holes 1121 and 1122, and/or noise 1131 and 1132 using a variety of post processes are further included. An example of the variety of post processes is Morphological Operating. Examples of the Morphological Operating include a Closing that performs an Erosion Operation after performing a Dilation Operation and an Opening that performs the Dilation Operation after the Erosion Operation. The Opening and the Closing respectively correspond to a process of filling up the holes of the result image and a process of eliminating the noise of the result image. Through the post processes, accuracy of the building region is getting high.

Figure 12:
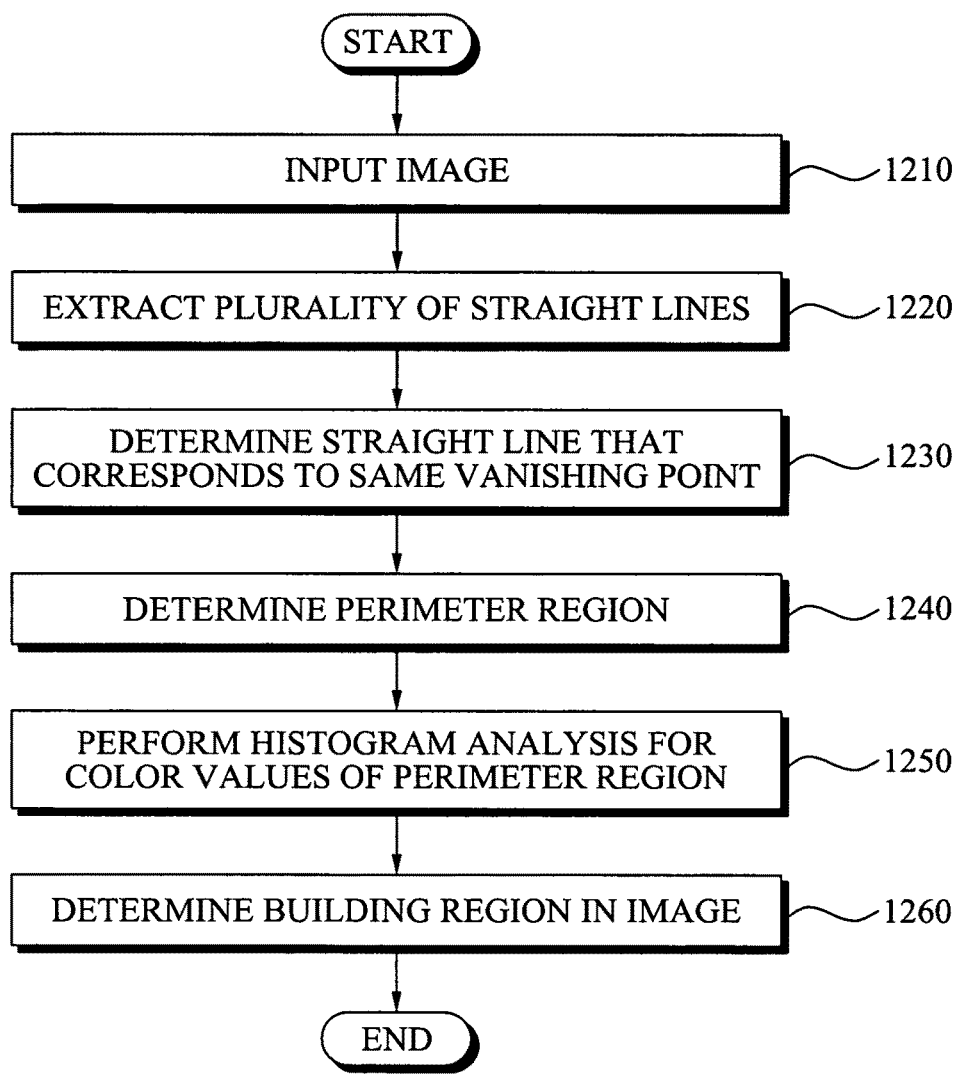
FIG. 12 illustrates a flowchart illustrating an image processing method according an exemplary embodiment.

FIG. 12 illustrates a flowchart illustrating an image process method according an exemplary embodiment.

In operation 1210, an image is inputted. The image is a color image. According to an exemplary embodiment, the color image is an image file comprised of RGB data. A file format of the color image may be in a variety of types, such as a bitmap (.bmp file), Joint Photographic Experts Group (.jpeg, .jpg files), and raw formats. When the file format is data-compression format, decompression may be performed before a start of the image process.

According to another exemplary embodiment, accuracy and/or efficiency of an image process increases through a variety of pre-processes to the input image. For example, a V (or a bright) or a C of the input image is adjusted, and the resulting adjusted image can be used as an input image of the image processing. Also, the pre-processes may include a variety of filter mask processes.

In operation 1220, a plurality of straight lines are extracted. A plurality of horizontal edges are extracted from the image. The edges, which correspond to an outline of an object, correspond to a corner between a face and another face or a unconnected face, and the like. The edges may include an edge that is close to a straight line, and an edge that is different from a straight lien. A plurality of straight lines at a plurality of angles are detected using the plurality of horizontal edges. Among the edges, an edge has a certain direction, and the length of which is longer than a predetermined length is detected as straight lines. The straight lines are a plurality of straight lines at the plurality of angles. The image of a result of extracting the plurality of straight lines corresponds to the image illustrated in FIG. 6.

In operation 1230, among the plurality of straight lines, straight lines that corresponds to the same vanishing point is determined. An algorithm for calculating the vanishing point has been suggested in an image processing field. Examples of the algorithm include a Random Sample Consensus (RANSAC) based algorithm. The straight lines that corresponds to the same vanishing point have a high probability of being a straight line of the building region.

In operation 1240, a perimeter region of the straight line that corresponds to the same vanishing point is determined. A group of pixels which are closer than a predetermined distance from a pixel of the straight line corresponding to the same vanishing point is determined as the perimeter region.

In operation 1250, the perimeter region is analyzed by a histogram analysis. A number of pixels of the perimeter corresponding to color values in the histogram is calculated. Upon making a graph of a calculation result, a color value having a great number of pixels is recognized. According to an exemplary embodiment, when the color value is not based on a HSV color model, the color value is transformed into HSV color value and analyzed by the histogram.

In operation 1260, the building region in the image is determined. A probability corresponding to each of the color values are calculated from the histogram. The perimeter region of the plurality of straight lines which pass through the vanishing point has a high probability of being in the building region. Thus, in the histogram analysis, the number of pixels of the perimeter region corresponding to the color values may corresponds to a probability that the color value band belongs to the building region. Thus, the graph may show a probability that the color value band belongs to the building region. According to an exemplary embodiment, an image processing method is provided, wherein a process of normalizing the graph is further included. Also, whether each of the pixels belongs to the building region in the image is determined based on the probability. For all of the pixels of the image, a probability that a color value of each pixel belongs to the building region is calculated.

The image processing method according to the above-described exemplary embodiments of the present invention may be recorded in computer-readable recording media including program instructions to implement various operations embodied by a computer. The media may also include, alone or in combination with the program instructions, data files, data structures, and the like. Examples of computer-readable recording media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. The computer-readable recording media may also be a distributed network, so that the computer readable code/instructions is/are stored/transferred and executed in a distributed fashion. The computer-readable recording media may also be one or more application specific integrated circuits.

Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of processing an image, comprising:
    extracting a plurality of straight lines that pass through a vanishing point from the image; and
    determining, based on a result of the extracting of the plurality of straight lines, a building region in the image based, at least in part, on color values of pixels that are determined to be within respective defined regions that correspond to the extracted plurality of straight lines using a computer, where at least one of the respective defined regions includes pixels of one of the plurality of straight lines that passes through the vanishing point and pixels of the image separate from the pixels of the one of the plurality of straight lines,
    wherein the extracting of the plurality of straight lines that pass through the vanishing point from the image comprises:
    when neighboring pixels which are determined as straight lines because the number of pixels that have the same direction exceeds a predetermined threshold, extracting a plurality of straight lines at a plurality of angles from the image; and
    extracting the plurality of straight lines that pass through the vanishing point from among the plurality of straight lines at the plurality of angles,
    wherein the pixels that correspond to the extracted plurality of straight lines that pass through the vanishing point are a part of the building region.

2. The method of claim 1, wherein the extracting of the plurality of straight lines at the plurality of angles from the image comprises:
    extracting a plurality of horizontal edges, wherein the horizontal edges include an edge having a certain direction corresponding to a straight line and the horizontal edges include an edge that does not have a certain direction or an edge that corresponds to a curve; and
    detecting the plurality of straight lines at the plurality of angles using the plurality of horizontal edges.

3. A method of processing an image, comprising:
    extracting a plurality of straight lines that pass through a vanishing point from the image; and
    determining a building region in the image based, at least in part, on color values of pixels that are separate from pixels that correspond to the extracted plurality of straight lines using a computer, wherein the extracting of the plurality of straight lines that pass through the vanishing point from the image comprises:

when neighboring pixels which are determined as straight lines because the number of pixels that have the same direction exceeds a predetermined threshold, extracting a plurality of straight lines at a plurality of angles from the image; and extracting the plurality of straight lines that pass through the vanishing point among the plurality of straight lines at a plurality of angles, wherein the pixels that correspond to the extracted plurality of straight lines that pass through the vanishing point are a part of the building region, wherein the determining of the building region in the image is based on color values around the plurality of straight lines and comprises:

determining a perimeter region of the plurality of straight lines;

performing a histogram analysis for the perimeter region; and determining the building region based on the histogram.

4. The method of claim 3, wherein the determining of the building region based on the histogram comprises:

calculating a probability corresponding to each of the color values from the histogram; and determining whether each pixel belongs to the building region in the image based on a color value of each pixel of the image and the probability corresponding to each of the color values.

5. A non-transitory computer-readable recording medium having stored thereon instructions for implementing a method of processing an image, the instructions comprising:

an instruction set of extracting a plurality of straight lines that pass through a vanishing point from the image; and an instruction set of determining, based on a result of the extracting of the plurality of straight lines, a building region in the image based, at least in part, on color values of pixels that are determined to be within respective defined regions that correspond to the extracted plurality of straight lines when the instruction set of determining the building region is executed by a computer, where at least one of the respective defined regions includes pixels of one of the plurality of straight lines that passes through the vanishing point and pixels of the image separate from the pixels of one of the plurality of straight lines, wherein the instruction set of extracting of the plurality of straight lines that pass through the vanishing point from the image comprises:

an instruction set of extracting a plurality of straight lines at a plurality of angles from the image; and an instruction set of extracting the plurality of straight lines that pass through the vanishing point from among the plurality of straight lines at the plurality of angles, wherein the pixels that correspond to the extracted plurality of straight lines that pass through the vanishing point are a part of the building region, and wherein when neighboring pixels which are determined as straight lines because the number of pixels that have the same direction exceeds a predetermined threshold, the pixels are detected as the plurality of straight lines at the plurality of angles.

6. The non-transitory computer-readable recording medium of claim 5, wherein the instruction set of extracting of the plurality of straight lines at the plurality of angles from the image comprises:

an instruction set of extracting a plurality of horizontal edges from the image, wherein the horizontal edges include an edge having a certain direction similar to a straight line and the horizontal edges include an edge that does not have a certain direction or an edge that is similar to a curve; and an instruction set of detecting the plurality of straight lines at the plurality of angles using the plurality of horizontal edges.

7. The non-transitory computer-readable recording medium of claim 6, wherein the instruction set of the extracting of the plurality of horizontal edges from the image comprises:

an instruction set of applying a Y-axis Sobel operator to the image and generating a Sobel Y gradient image so as to extract the plurality of horizontal edges.

8. The non-transitory computer-readable recording medium of claim 6, wherein the instruction set of the detecting of the plurality of straight lines at the plurality of angles using the plurality of horizontal edges comprises:

an instruction set of using either a Hough transform method or a Chain Code method.

9. The non-transitory computer-readable recording medium of claim 5, wherein the instruction set of the extracting of the plurality of straight lines that pass through the vanishing point among the plurality of straight lines at the plurality of angles further comprises:

an instruction set of forming an equation of each line in the plurality of straight lines at the plurality of angles; and an instruction set of extracting the plurality of straight lines that pass through the vanishing point among the plurality of straight lines at the plurality of angles based on a difference between a y coordinate value of the vanishing point and a y coordinate value of the equation, the equation corresponding to an x coordinate value of the vanishing point.

10. The non-transitory computer-readable recording medium of claim 9, wherein the instruction set of the extracting of the plurality of straight lines that pass through the vanishing point among the plurality of straight lines at the plurality of angles based on the difference between the y coordinate value of the vanishing point and the y coordinate value of the equation comprises:

an instruction set of determining a threshold; and an instruction set of comparing the threshold with an absolute value of the difference between the y coordinate value of the vanishing point and the y coordinate value of the equation, the equation corresponding to the x coordinate value of the vanishing point.

11. A non-transitory computer-readable recording medium having stored thereon instructions for implementing a method of processing an image, the instructions comprising:

an instruction set of extracting a plurality of straight lines that pass through a vanishing point from the image; and an instruction set of determining a building region in the image based on color values around the plurality of straight lines when the instruction set of determining the building region is executed by a computer, wherein the instruction set of the determining of the building region in the image based on the color values around the plurality of straight lines comprises:

an instruction set of determining a perimeter region of the plurality of straight lines, wherein the perimeter regions are closer than predetermined distance from pixels corresponding to straight lines and the predetermined distance is varied based on quality of the processed image;

an instruction set of performing a histogram analysis for the perimeter region; and
an instruction set of determining the building region based on the histogram.

12. The non-transitory computer-readable recording medium of claim 11, wherein the color values are a Hue (H) based on a Hue, Saturation, Value (HSV) color model.

13. The non-transitory computer-readable recording medium of claim 12, wherein the instruction set of the performing of the histogram analysis for the perimeter region comprises:
an instruction set of performing a histogram analysis for the hue of the perimeter region excluding a pixel with V (a value) equal to or greater than a predetermined value.

14. The non-transitory computer-readable recording medium of claim 11, wherein the instruction set of the determining of the building region based on the histogram comprises:
an instruction set of calculating a probability corresponding to each of the color values from the histogram; and
an instruction set of determining whether each pixel belongs to the building region in the image based on a color value of each pixel of the image and the probability corresponding to each of the color values.

15. A non-transitory computer-readable recording medium having stored thereon instructions for implementing a method of processing an image, the instructions comprising:
an instruction set of extracting a plurality of straight lines from the image;
an instruction set of determining a straight line that corresponds to the same vanishing point among the plurality of straight lines; and
an instruction set of determining a building region in the image based on color values of a perimeter region of the straight line that corresponds to the same vanishing point when the instruction set of determining the building region is executed by a computer,
wherein the instruction set of the determining of the building region in the image based on the color values of the perimeter region of the straight line that corresponds to the same vanishing point comprises:
an instruction set of determining a predetermined region around the straight line that corresponds to the same vanishing point as the perimeter region, wherein the perimeter region is closer than predetermined distance from pixel corresponding to the straight line and the predetermined distance is varied based on quality of the processed image;
an instruction set of performing a histogram analysis for the color values of the perimeter region; and
an instruction set of determining the building region based on the histogram.

16. The non-transitory computer-readable recording medium of claim 15, wherein the instruction set of performing of the histogram analysis for the color values of the perimeter region is based on a Hue, Saturation, Value (HSV) color model.

17. The non-transitory computer-readable recording medium of claim 15, further comprising:
an instruction set of performing a normalization of the histogram so as to analyze a probability that a first pixel belongs to the building region.

18. The method of claim 1, wherein the at least one respective defined region is a perimeter region, the perimeter region is closer than a predetermined distance from the pixels of the one of the plurality of straight lines, and the predetermined distance is varied based on a determined quality of the image.

19. The method of claim 18,
performing a histogram analysis for the perimeter region; and
determining the building region based on the histogram.

20. The method of claim 19,
wherein the performing of the histogram analysis for the perimeter region is performed on pixels around the extracted plurality of straight lines, and is based on a Hue Saturation Value (HSV) histogram analysis, and
wherein the HSV histogram analysis is performed on the pixels of the image separate from the pixels of the one of the plurality of straight lines.

21. The method of claim 5, wherein the at least one respective defined region is a perimeter region, the perimeter region is closer than a predetermined distance from the pixels of the one of the plurality of straight lines, and the predetermined distance is varied based on a determined quality of the image.

22. The method of claim 21,
performing a histogram analysis for the perimeter region; and
determining the building region based on the histogram.

23. The method of claim 22,
wherein the performing of the histogram analysis for the perimeter region is performed on pixels around the extracted plurality of straight lines, and is based on a Hue Saturation Value (HSV) histogram analysis, and
wherein the HSV histogram analysis is performed on the pixels of the image separate from the pixels of the one of the plurality of straight lines.

24. A method of processing an image, comprising:
extracting a plurality of straight lines that pass through a vanishing point from the image; and
determining, based on a result of the extracting of the plurality of straight lines, a building region in the image based, at least in part, on color values of pixels that are determined to be within respective defined regions that correspond to the extracted plurality of straight lines using a computer, where at least one of the respective defined regions includes pixels of one of the plurality of straight lines that passes through the vanishing point and pixels of the image separate from the pixels of the one of the plurality of straight lines,
wherein the pixels of one of the plurality of straight lines that passes through the vanishing point and the pixels of the image separate from the pixels of the one of the plurality of straight lines are a part of the building region.

25. The method of claim 24, wherein the at least one respective defined region is a perimeter region, the perimeter region is closer than a predetermined distance from the pixels of the one of the plurality of straight lines, and the predetermined distance is varied based on a determined quality of the image.

26. The method of claim 25,
performing a histogram analysis for the perimeter region; and
determining the building region based on the histogram.

27. The method of claim 26,
wherein the performing of the histogram analysis for the perimeter region is performed on pixels around the extracted plurality of straight lines, and is based on a Hue Saturation Value (HSV) histogram analysis, and
wherein the HSV histogram analysis is performed on the pixels of the image separate from the pixels of the one of the plurality of straight lines.

28. The method of claim 26, wherein the determining of the building region based on the histogram comprises:

calculating a probability corresponding to each of plural color values from the histogram; and determining whether each of plural select pixels of the image belongs to the building region based on a color value of each of the plural select pixels and the probability corresponding to each of the plural color values.

\* \* \* \* \*